Oct. 20, 1931.    J. C. ZEDER ET AL    1,828,305
GEAR
Filed Jan. 5, 1927

INVENTORS
JAMES C ZEDER
BY AND OTTO J BRATZ
ATTORNEY

Patented Oct. 20, 1931　　　　　　　　　　　　　　　　1,828,305

UNITED STATES PATENT OFFICE

JAMES C. ZEDER AND OTTO J. BRATZ, OF DETROIT, MICHIGAN, ASSIGNORS TO CHRYSLER CORPORATION, OF DETROIT, MICHIGAN, A CORPORATION OF DELAWARE

GEAR

Application filed January 5, 1927. Serial No. 159,191.

This invention relates to gears and more particularly to sliding gears mounted on a splined shaft such as are commonly used in automobile transmissions.

In the use of a driving or driven gear adapted for sliding movement on a splined shaft, it is necessary to provide a certain amount of clearance between the gear and shaft to permit easy sliding. This clearance causes a back lash which is objectionable when the gear is in rotary motion. It is therefore an important object of this invention to eliminate that back lash.

Another object of the invention is to provide a member adapted to exert angular tension between the gear and its shaft thereby taking up the clearance in the direction of rotation.

A further object of the invention is to progressingly increase the tension as the speed of rotation of the gear and shaft is increased, thus exerting no tension between the gear and shaft when they are idle and exerting maximum tension when they are rotated at maximum speed.

The above and other objects of our invention will more fully appear from the following descripton taken in connection with the accompanying drawings, in which.

Figure 1:
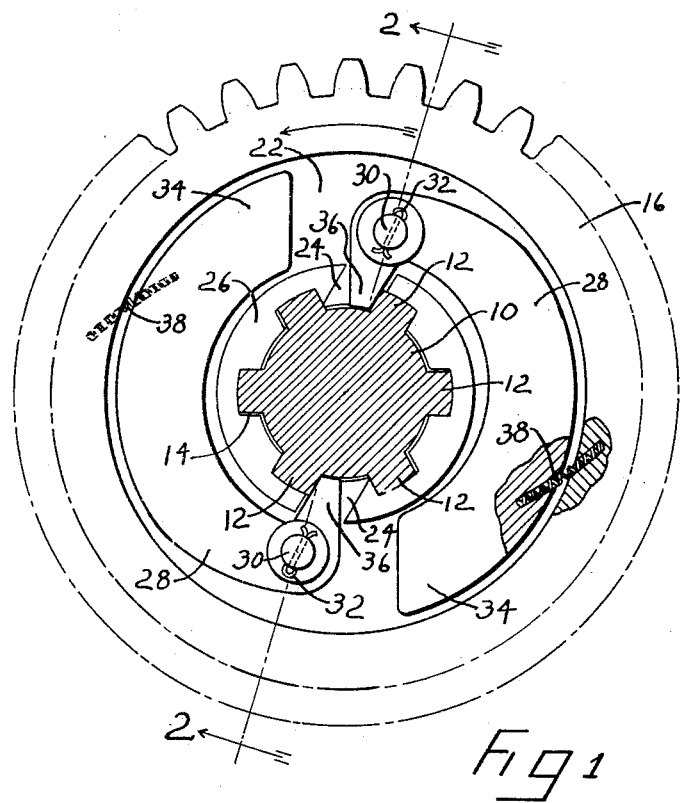
Fig. 1 is a side elevation of a transmission gear with the shaft in section showing an adaptation of the device.
Figure 2:
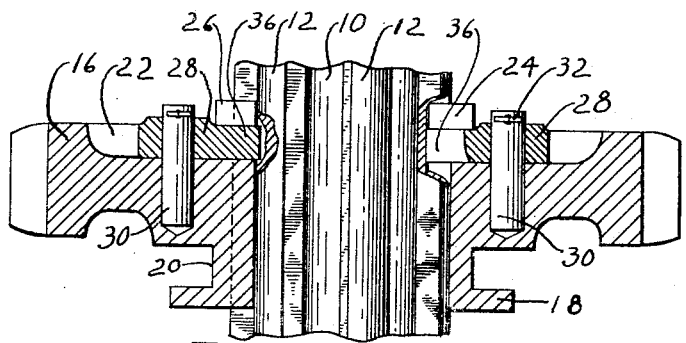
Fig. 2 is a sectional view taken on line 2—2 of Fig. 1.

Referring to an illustrated embodiment of our invention, a splined shaft 10 has been shown having longitudinal projections 12 which freely fit depressions 14 in a gear 16 mounted on the shaft 10. The gear 16 is shown as a transmission sliding gear provided with a collar 18 and an annular recess 20 which receives a gear shifter fork, (not shown).

A certain amount of clearance has been provided between the projections 12 and depressions 14 to permit easy sliding of the gear 16 on the shaft 10. This clearance permits a back lash, causing a chatter, particularly objectionable when the parts become worn and the clearance increased.

As a desirable means of overcoming this objection, applicants have provided an annular recess 22 in one side of the gear 16 and slots or openings 24 in the hub 26, which receive pivoted members 28 adapted to engage the projections 12 on the shaft 10. The members 28 are pivoted on pins 30 carried by the gear 16 and keys 32 hold the members on the pins 30. Each arm is provided with a long, weighted lever arm 34 extending from the pin 30 circumferentially around the shaft 10 in the recess 22, and a short lever arm 36 extending from the pin 30 radially toward the axis of the shaft 10, through the slot 24 and in engagement with one of the projections 12 on the splined shaft. The weighted arms are arranged within the recess 22 in such a manner that one balances the other and are free to move therein. Tension springs 38, interposed between the gear 16 and arms 34, force the latter inwardly relieving the tension of the arm 36 against the projection 12. When the gear is in rotation, the centrifugal force throws the long weighted arm 34 away from the shaft and the short arm 36 is brought into engagement with the projection 12, forcing the gear in one direction around the shaft taking up the clearance.

The arrow indicates the rotation of the gear and the members 28 have been arranged to exert a tension on the shaft 10 in a corresponding direction so that the gear is constantly urged in the direction of its rotation. It will be understood that when the gear is intended to be rotated in the opposite direction, the members may be reversed to exert tension in that direction.

Gears are usually shifted at idle or low speeds and as the centrifugal force is practically negligible at those periods little tension is exerted between the gear and shaft thus facilitating sliding of the gear, but when the higher speeds are reached the centrifugal force is increased, thereby exerting more and more tension between the gear and shaft which entirely eliminates back lashing.

While we have described what we deem to be a preferred form of our invention, it is to be understood that various changes including size and arrangement of parts may be made without departing from the spirit of our invention and it is not our intention to limit its scope other than by the terms of the appended claims.

What we claim is:

1. In the combination of a rotatable shaft, a gear axially slidable on said shaft and rotatable therewith, and a member movable by the rotation of said gear and carried by said gear adapted to engage said shaft to urge said gear angularly on said shaft only when the gear is rotated.

2. In the combination of a rotatable shaft, a gear axially slidable on said shaft and rotatable therewith, a member carried by said gear actuated by centrifugal force and adapted to engage said shaft to progressingly urge said gear angularly on said shaft only when the speed or rotation of the shaft and gear is increased, and means to permit free axial movement of said gear on said shaft when the latter is quiescent.

3. In a construction of the class described comprising, a splined shaft, a gear axially slidable on said shaft and rotatable therewith, a member pivoted to said gear adapted to engage said shaft to urge said gear angularly on said shaft, said member having an arm extending circumferentially around said shaft to swing outwardly by the action of centrifugal force and an arm extending radially of said shaft, and resilient means adapted to urge the radially extending arm on said member away from said shaft to permit free sliding movement of said gear.

4. In a gear of the class described having the inner periphery of its central opening adapted to fit a splined shaft, means carried by said gear movable by centrifugal force to engage the splines on the shaft when said gear is rotated, means for disengaging said last named means from the splines when said gear is quiescent.

5. In a gear of the class described having the inner periphery of its central opening provided with a slot, a shaft adapted to be received in said central opening and having a projection adapted to be received in said slot, a short arm pivoted to said gear adapted to engage one side of the projection on said shaft, and a long arm connected to said short arm in such a manner that the centrifugal force of said long arm causes movement of said short arm and means for disengaging said last named means from said splines when said gear is quiescent.

6. In a gear of the class described having the inner periphery of its central opening provided with a slot, a member pivoted to the side of said gear in such a manner that a portion thereof lies adjacent the side of the slot and another portion thereof extends circumferentially around said central opening whereby centrifugal force caused by the rotation of said gear urges said short arm beyond the side of the slot in the center opening of the gear.

7. In a gear of the class described having the inner periphery of its central opening provided with a plurality of slots adapted to fit a splined shaft, an annular recess in the side of said gear, a pair of long arms within said recess and pivoted at their opposite ends at points diametrically opposite on said gear, and short arms connected to said long arms extending radially of said gear from the pivot point and adjacent one side of said slots whereby centrifugal force caused by the rotation of said gear urges said short arms against opposite splines on said shaft.

8. In a construction of the class described comprising a rotatable splined shaft, a member rotatable with said shaft slidable thereon, and means operably by centrifugal force, for engaging and urging said member angularly on said shaft in the direction of the rotation of said shaft and member, and means for causing the disengagement of said last named means when the member and shaft are quiescent.

9. In a construction of the class described comprising a rotatable splined shaft, a member rotatable with said shaft and axially slidable thereon, means actuating through centrifugal force for progressingly urging said member angularly on said shaft as the speed of rotation of said shaft and member is increased, and means for releasing said urging means when the shaft is quiescent to permit free axial movement of the member on said shaft.

JAMES C. ZEDER.
OTTO J. BRATZ.